(12) United States Patent
Werner et al.

(10) Patent No.: US 9,649,650 B2
(45) Date of Patent: May 16, 2017

(54) MIXING AND DISPENSING DEVICE

(71) Applicant: Mouse Trap Design, LLC, Carnegie, PA (US)

(72) Inventors: Melanie R. Werner, Carnegie, PA (US); Paul J. Mulhauser, New York, NY (US); John Puskar-Pasewicz, Pittsburgh, PA (US)

(73) Assignee: Mouse Trap Design, LLC, Carnegie, PA (US)

( * ) Notice: Subject to any disclaimer, the term of this patent is extended or adjusted under 35 U.S.C. 154(b) by 0 days.

(21) Appl. No.: 14/704,654

(22) Filed: May 5, 2015

(65) Prior Publication Data
US 2015/0231658 A1 Aug. 20, 2015

Related U.S. Application Data

(63) Continuation-in-part of application No. 14/536,331, filed on Nov. 7, 2014, now abandoned.
(Continued)

(51) Int. Cl.
*B05B 11/00* (2006.01)
*B29B 7/74* (2006.01)

(52) U.S. Cl.
CPC ......... *B05B 11/007* (2013.01); *B05B 11/0018* (2013.01); *B05B 11/3081* (2013.01); *B29B 7/7438* (2013.01)

(58) Field of Classification Search
CPC ............... B05B 11/0018; B05B 11/007; B05B 11/3081; B05B 11/3083; B05B 15/002; B29B 7/7438; B29B 7/801
See application file for complete search history.

(56) References Cited

U.S. PATENT DOCUMENTS 704,105 A 7/1902 Reed
2,118,704 A 5/1938 Grontkowski
(Continued)

FOREIGN PATENT DOCUMENTS

DE 29511932 U1 11/1996
DE 102006027778 A1 5/2008
(Continued)

OTHER PUBLICATIONS

Title: Miks Trail Dispenser, URL: http://www.interzinc.com/zinc-challenge/results.html, Accessed: Dec. 19, 2012.
(Continued)

*Primary Examiner* — Frederick C Nicolas
*Assistant Examiner* — Bob Zadeh
(74) *Attorney, Agent, or Firm* — Alicia M. Passerin, Esq.; Pietragallo Gordon Alfano Bosick & Raspanti, LLP (57) ABSTRACT

A device for mixing and dispensing fluids has first and second walls that form a chamber connected to a nozzle. Inlets each configured to receive one fluid are arranged in the first wall. Proximate edges of the inlets are an equal distance from a central point on the first wall. A seal having top and bottom surfaces and a center through hole is positioned in the chamber. The center hole is substantially aligned with the central point. A surface area of the top surface is greater than a sum of the sectional areas of the inlets. A dispensing pump moves the seal between a sealed position in which the bottom surface seals the inlets and an open position in which the bottom surface is spaced away from the inlets to open the inlets to draw the fluids into the chamber to form the mixture for dispensing through the nozzle.

18 Claims, 12 Drawing Sheets

Related U.S. Application Data (60) Provisional application No. 61/962,510, filed on Nov. 7, 2013.

(56) References Cited

U.S. PATENT DOCUMENTS

| | | | |
|---|---|---|---|
| 2,400,955 A | 5/1946 | Samel | |
| 2,608,320 A | 8/1952 | Harrison | |
| 3,208,639 A | 9/1965 | Marwell | |
| 3,236,418 A | 2/1966 | Dalle et al. | |
| 3,384,119 A | 5/1968 | Manoogian | |
| 3,392,859 A | 7/1968 | Fischer | |
| 3,685,694 A | 8/1972 | Ianelli | |
| 3,709,437 A | 1/1973 | Wright | |
| 3,760,986 A | 9/1973 | Castner et al. | |
| 3,786,963 A | 1/1974 | Metzler | |
| 3,813,011 A | 5/1974 | Harrison et al. | |
| 3,865,134 A | 2/1975 | Holcomb | |
| 4,006,841 A | 2/1977 | Alticosalian | |
| 4,011,288 A | 3/1977 | Assenheimer et al. | |
| 4,129,231 A | 12/1978 | Larson | |
| 4,285,445 A | 8/1981 | Vander Molen et al. | |
| 4,372,100 A | 2/1983 | Miller et al. | |
| 4,469,250 A | 9/1984 | Evezich | |
| 4,484,597 A | 11/1984 | Bravo | |
| 4,496,081 A | 1/1985 | Farrey | |
| 4,549,674 A | 10/1985 | Alticosalian | |
| 4,770,323 A | 9/1988 | Debard | |
| 4,881,575 A | 11/1989 | Smith | |
| 4,993,594 A | 2/1991 | Becker et al. | |
| 5,169,029 A | 12/1992 | Behar et al. | |
| 5,188,455 A | 2/1993 | Hammerstedt | |
| 5,332,157 A * | 7/1994 | Proctor | B05B 11/0018 222/136 |
| 5,385,270 A * | 1/1995 | Cataneo | B05B 11/3083 222/134 |
| 5,398,846 A | 3/1995 | Corba et al. | |
| 5,402,916 A | 4/1995 | Nottingham et al. | |
| 5,562,250 A | 10/1996 | O'Neill | |
| 5,634,571 A | 6/1997 | Cataneo et al. | |
| 5,769,275 A * | 6/1998 | Boehmer | B05B 11/0016 222/136 |
| 5,813,573 A * | 9/1998 | Battegazzore | B05B 11/0048 222/135 |
| 5,848,730 A | 12/1998 | Kawase et al. | |
| 5,848,732 A | 12/1998 | Brugger | |
| 5,865,797 A | 2/1999 | Zeeman | |
| 5,897,539 A | 4/1999 | Elliesen et al. | |
| 5,967,373 A | 10/1999 | Seager et al. | |
| 6,021,961 A * | 2/2000 | Brown | B29B 7/7438 239/398 |
| 6,082,593 A | 7/2000 | Borcherds | |
| 6,223,788 B1 | 5/2001 | Taylor | |
| 6,328,543 B1 | 12/2001 | Benecke | |
| 6,398,077 B1 * | 6/2002 | Gross | B65D 47/2031 222/145.1 |
| 6,543,490 B1 | 4/2003 | Owens | |
| 6,557,732 B2 | 5/2003 | Van Rompuy et al. | |
| 6,719,729 B2 | 4/2004 | Sogaro | |
| 6,736,288 B1 | 5/2004 | Green | |
| 6,793,098 B2 | 9/2004 | Huber et al. | |
| 6,877,638 B2 | 4/2005 | Chan et al. | |
| 6,971,549 B2 | 12/2005 | Leifheit et al. | |
| 7,044,402 B2 | 5/2006 | Finn | |
| 7,152,758 B2 | 12/2006 | Fazzio et al. | |
| 7,222,802 B2 | 5/2007 | Sweeton | |
| 7,267,248 B2 | 9/2007 | Yerby et al. | |
| 7,377,404 B2 | 5/2008 | Cherfane | |
| 7,481,334 B2 | 1/2009 | Arghyris et al. | |
| 7,481,335 B2 | 1/2009 | Owens | |
| 7,487,888 B1 | 2/2009 | Pierre, Jr. | |
| 7,487,889 B2 | 2/2009 | Owens | |
| 7,537,139 B2 | 5/2009 | Jackson et al. | |
| 7,559,440 B2 | 7/2009 | Rueschhoff et al. | |
| 7,594,594 B2 | 9/2009 | Troost et al. | |
| 7,641,075 B2 | 1/2010 | Crews | |
| 7,717,297 B2 | 5/2010 | Kadyk et al. | |
| 7,775,401 B2 | 8/2010 | Banco et al. | |
| 7,789,273 B2 | 9/2010 | Kadyk et al. | |
| 7,789,278 B2 | 9/2010 | Ruiz de Gopegui et al. | |
| 7,819,342 B2 | 10/2010 | Spallek et al. | |
| 7,861,893 B2 | 1/2011 | Voegele et al. | |
| 7,875,001 B2 | 1/2011 | Minotti | |
| 7,967,220 B2 | 6/2011 | Hansen et al. | |
| 8,523,017 B2 | 9/2013 | Vellutato et al. | |
| 8,684,233 B2 | 4/2014 | Nishio et al. | |
| 9,180,476 B2 | 11/2015 | Werner et al. | |
| 2001/0013523 A1 * | 8/2001 | Gross et al. | B65D 47/2031 222/94 |
| 2001/0025859 A1 * | 10/2001 | Dumont | B05B 11/3081 222/136 |
| 2003/0075573 A1 | 4/2003 | Bailey | |
| 2004/0159677 A1 | 8/2004 | Hwang | |
| 2005/0042122 A1 * | 2/2005 | Arghyris | B05B 11/0072 417/521 |
| 2007/0012725 A1 | 1/2007 | Jajeh | |
| 2007/0069046 A1 | 3/2007 | Eini et al. | |
| 2008/0110930 A1 | 5/2008 | Wittkamp et al. | |
| 2008/0203110 A1 * | 8/2008 | LaFlamme et al. | B65D 81/3261 222/135 |
| 2009/0005903 A1 | 1/2009 | Winsness | |
| 2009/0152298 A1 | 6/2009 | Woolfson | |
| 2009/0194561 A1 | 8/2009 | Quasters | |
| 2009/0216183 A1 | 8/2009 | Minotti | |
| 2010/0065130 A1 | 3/2010 | Swab | |
| 2010/0108779 A1 | 5/2010 | Filsouf | |
| 2010/0133293 A1 | 6/2010 | Ziesel | |
| 2010/0185322 A1 | 7/2010 | Bylsma et al. | |
| 2010/0252574 A1 | 10/2010 | Busin | |
| 2010/0264162 A1 | 10/2010 | Cratensburg et al. | |
| 2011/0011888 A2 | 1/2011 | Bevis et al. | |
| 2011/0079610 A1 | 4/2011 | Kadyk et al. | |
| 2011/0121034 A1 | 5/2011 | Swab et al. | |
| 2011/0139180 A1 | 6/2011 | Williams et al. | |
| 2011/0174837 A1 | 7/2011 | Nelson et al. | |
| 2011/0204090 A1 | 8/2011 | Worthington et al. | |
| 2011/0215113 A1 | 9/2011 | Hansen et al. | |
| 2011/0259912 A1 | 10/2011 | Choiniere et al. | |
| 2011/0303694 A1 | 12/2011 | Pi | |
| 2012/0279990 A1 | 11/2012 | Werner et al. | |
| 2015/0231658 A1 * | 8/2015 | Werner | B05B 11/3083 222/145.6 |

FOREIGN PATENT DOCUMENTS

| | | |
|---|---|---|
| EP | 0676339 A2 | 10/1995 |
| FR | 1408299 a | 8/1995 |
| WO | 2008/053311 A2 | 5/2008 |

OTHER PUBLICATIONS

Title: Dual-chambered dispenser, URL: http://www.packworld.com/applications/personal-care/dual-chambered-dispenser, Accessed: Jun. 28, 2012.

Title: Variblend, URL: http://www.variblend.com, Accessed: Dec. 19, 2012.

Title: Dual-chamber Yonwoo dispenser for Biotherm Age Fitness Elastic, URL: http://www.quadpack.net/uk/our-products/latest-launchesidual-chamber-yonwoo-dispenser-for-biotherm-ageitness-elastic/, Accessed: Jun. 28, 2012.

Title: Two-in-One bottle for olive oil and vinegar, URL: http://bestinpackaging.com/2011/05105/dual-chamber-bottles/, Accessed: Dec. 19, 2012.

* cited by examiner

MIXING AND DISPENSING DEVICE

CROSS-REFERENCE TO RELATED APPLICATIONS

This application is a continuation-in part of U.S. patent application Ser. No. 14/536,331, filed on Nov. 7, 2014, entitled "Mixing and Dispensing Device," which claims priority to U.S. Provisional Application No. 61/962,510, filed on Nov. 7, 2013, entitled "Mixing and Dispensing Device," both of which are incorporated herein by reference.

BACKGROUND

Various devices are known in the art to dispense fluids. Typically, dispensers hold a single fluid. However, it is often desirable for multiple fluids to be stored in separate storage containers within a single device, and then mixed and immediately dispensed as a mixture from the device. In various industries, including the cosmetic industry, it is desirable to have a device that is configured to proportionally adjust the volumetric ratio of each fluid that makes up the mixture, in order to provide a customized product that includes each of a plurality of fluids.

SUMMARY

In an aspect, a device for dispensing a mixture of at least two fluids contained in at least two containers is disclosed, comprising: a body comprising first and second walls that form a chamber that is connected to a nozzle; at least two spaced-apart inlets to the chamber arranged in an array in the first wall of the body such that proximate edges of the at least two inlets are an equal distance from a generally central point on the first wall, each of the inlets having a sectional area, and each of the inlets being configured to receive the fluid from one of the at least two containers; a seal positioned in the chamber adjacent to the first wall, wherein the seal has a top surface, a bottom surface, and a center through hole substantially aligned with the central point; wherein a surface area of the top surface is greater than a sum of the sectional areas of the at least two inlets; wherein the seal is moveable between a sealed position in which the bottom surface seals the at least two inlets and an open position in which the bottom surface is spaced away from the at least two inlets to open the inlets to the chamber through the hole; and a dispensing pump that is operable to move the seal between the sealed and the open positions; wherein the nozzle is configured to dispense the mixture upon activation.

In another aspect, a device for dispensing a mixture of at least two fluids contained in at least two containers, comprising: a body comprising first and second walls that form a chamber that is connected to a nozzle; at least two spaced-apart inlets to the chamber arranged in an array in the first wall of the body such that proximate edges of the at least two inlets are an equal distance from a generally central point on the first wall, each of the inlets having a sectional area, and each of the inlets being configured to receive the fluid from one of the at least two containers; a seal having a top surface, a bottom surface, and a central shaft secured in the chamber by securing the central shaft in the first wall at the central point such that the central shaft of the seal is substantially aligned with the central point; wherein a surface area of the top surface is greater than a sum of the sectional areas of the at least two inlets; wherein the seal is moveable between a sealed position in which the bottom surface seals the at least two inlets and an open position in which the bottom surface is spaced away from the at least two inlets to open the inlets to the chamber; and a dispensing pump that is operable to move the seal between the sealed and the open positions; wherein the nozzle is configured to dispense the mixture upon activation.

DETAILED DESCRIPTION

As shown generally in the Figures, according to the present invention, disclosed is a device 100 for dispensing, a mixture of fluids. As described above, the device 100 comprises a body 105 comprising first and second walls 111, 115 that form a chamber 120 that is connected to a nozzle 160. At least two spaced-apart inlets 130 to the chamber 120 may be arranged in an array in the first wall 111, each of the inlets 130 being configured to receive the fluid from one of the at least two containers 105. A seal 140 for sealing the inlets 130 may be positioned in the chamber 120. The device also comprises a dispensing pump 150 operable to move the seal 140 from a sealed position (FIGS. 4A, 4B, 8A, 8B) to an open position (FIG. 4C, 8C) and to draw the fluids from the containers 105 through the at least two inlets 130 into the chamber 120 to form the mixture. The nozzle 160 may be configured to dispense the mixture upon activation.

The device 100 may be configured for use with at least two containers 105 positioned in an array. According to the present invention, the containers 105 may be positioned in a linear array (FIG. 6A) or a non-linear array (not shown).

Figure 6A:
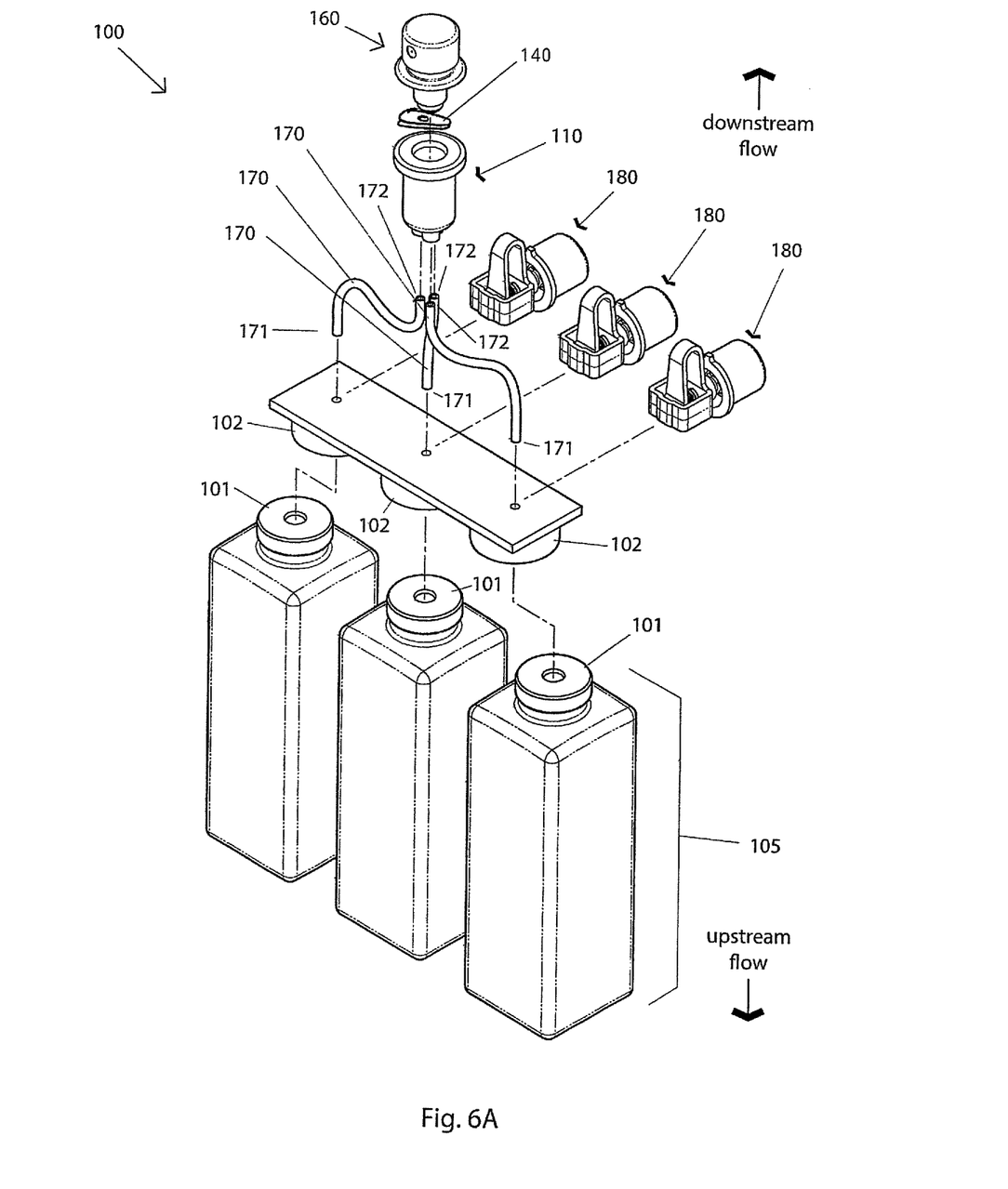
FIGS. 6A-6C are aspects of the device, showing (FIG. 6A) an exploded view of the device, (FIG. 6B) an exploded view of a container, and (FIG. 6C) a container having a bladder.
Figure 6B:
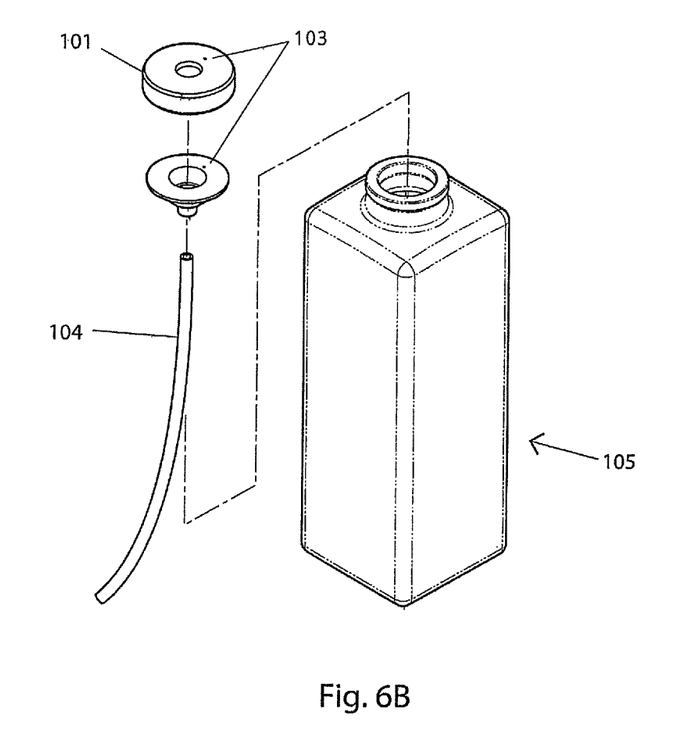
Figure 6C:
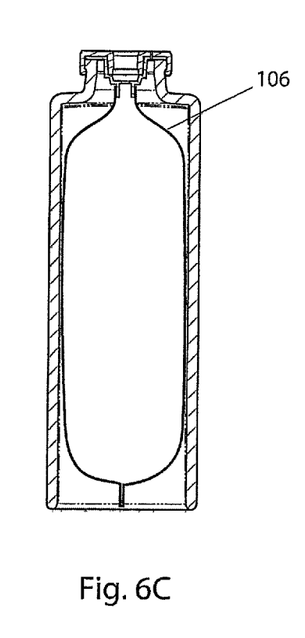

Each container 105 is configured to hold a fluid. In various aspects, the fluid may be a fragrance oil, a solvent, a pigment, an ink, a dye, a medication, a cream, a lotion, a dietary supplement, a flavoring, a spirit, a cleaning substance, or any other such substance available in a liquid form. Various optional features of the container 105 are shown in FIGS. 6A-6C and are described in detail below.

Figure 1A:
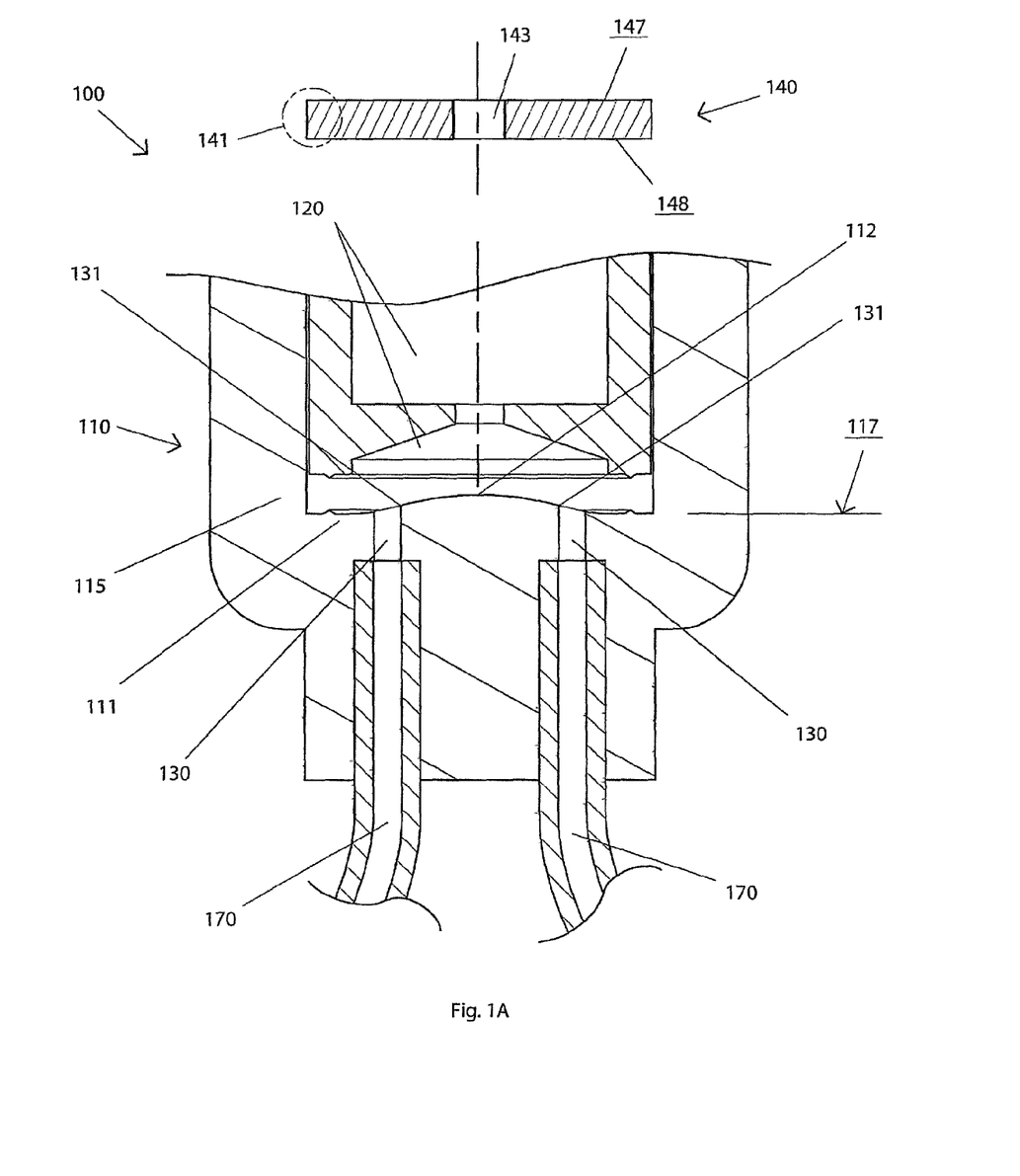
FIGS. 1A-1B are cross-sectional front views of mixing and dispensing devices according to the present invention taken through the body and the flow channels and showing a planar seal and a convex curved first wall (FIG. 1A) as a partial assembly and (FIG. 1B) a contoured seal and a convex curved first wall in the assembled state.
Figure 1B:
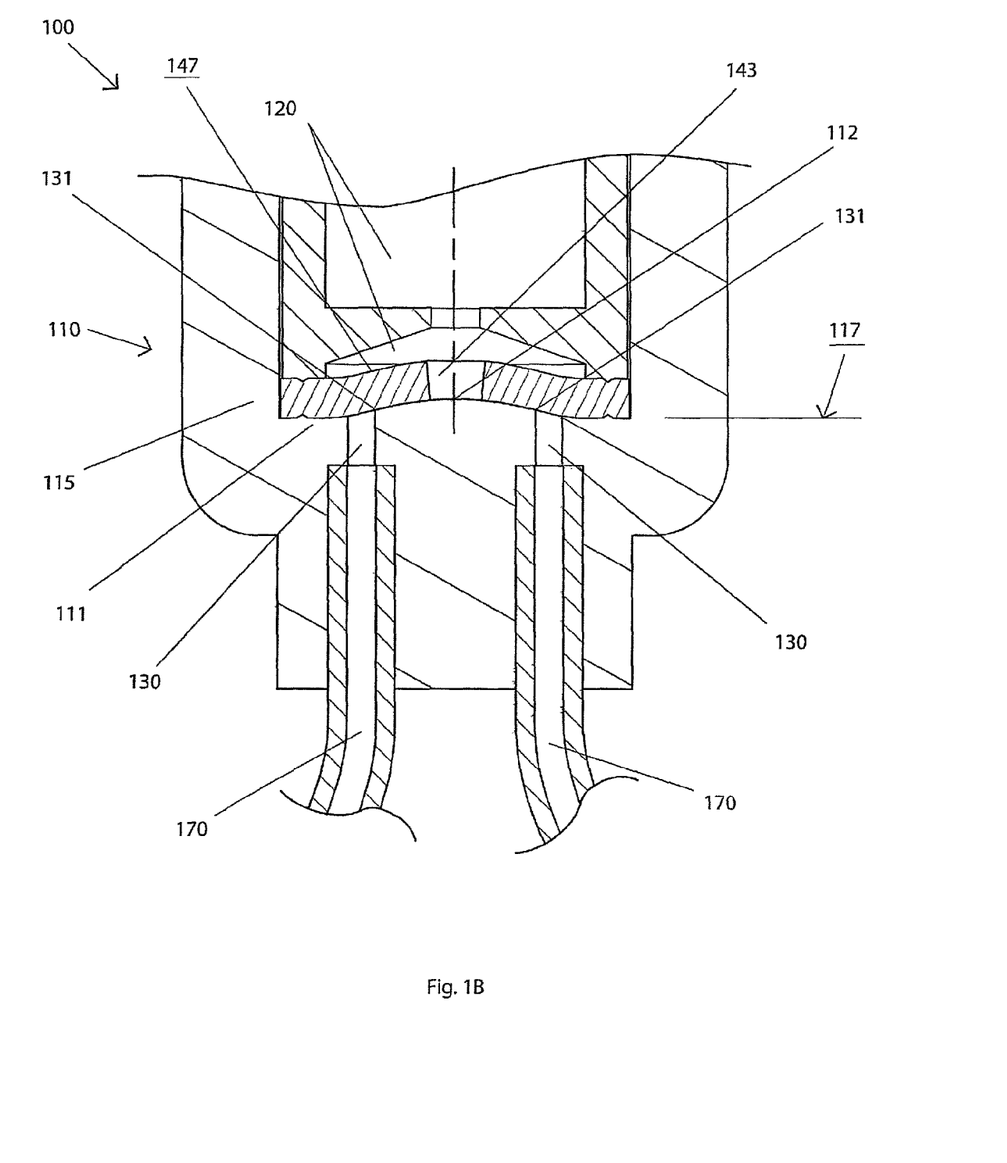
Figure 2A:
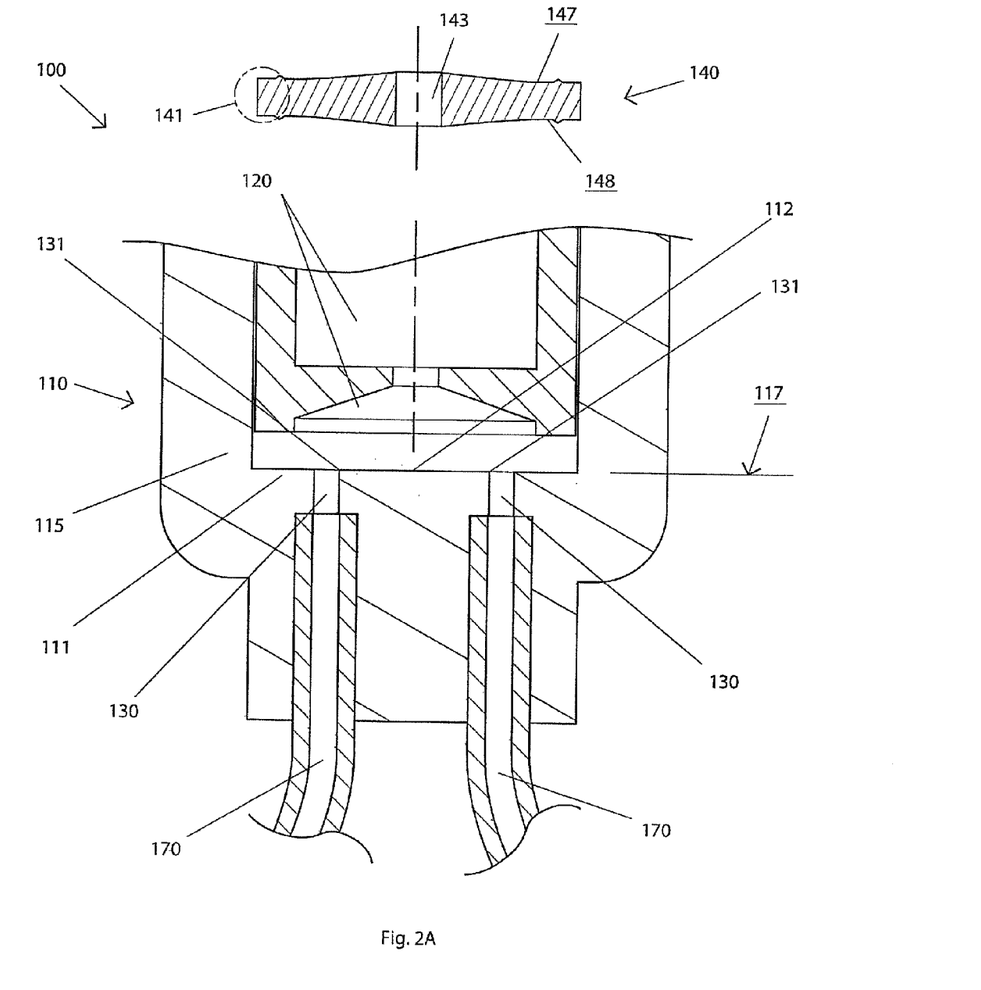
FIGS. 2A-2B are cross-sectional front views of mixing and dispensing devices according to the present invention taken through the body and the flow channels and showing a contoured seal and a planar first wall (FIG. 2A) as a partial assembly and (FIG. 2B) in the assembled state.
Figure 2B:
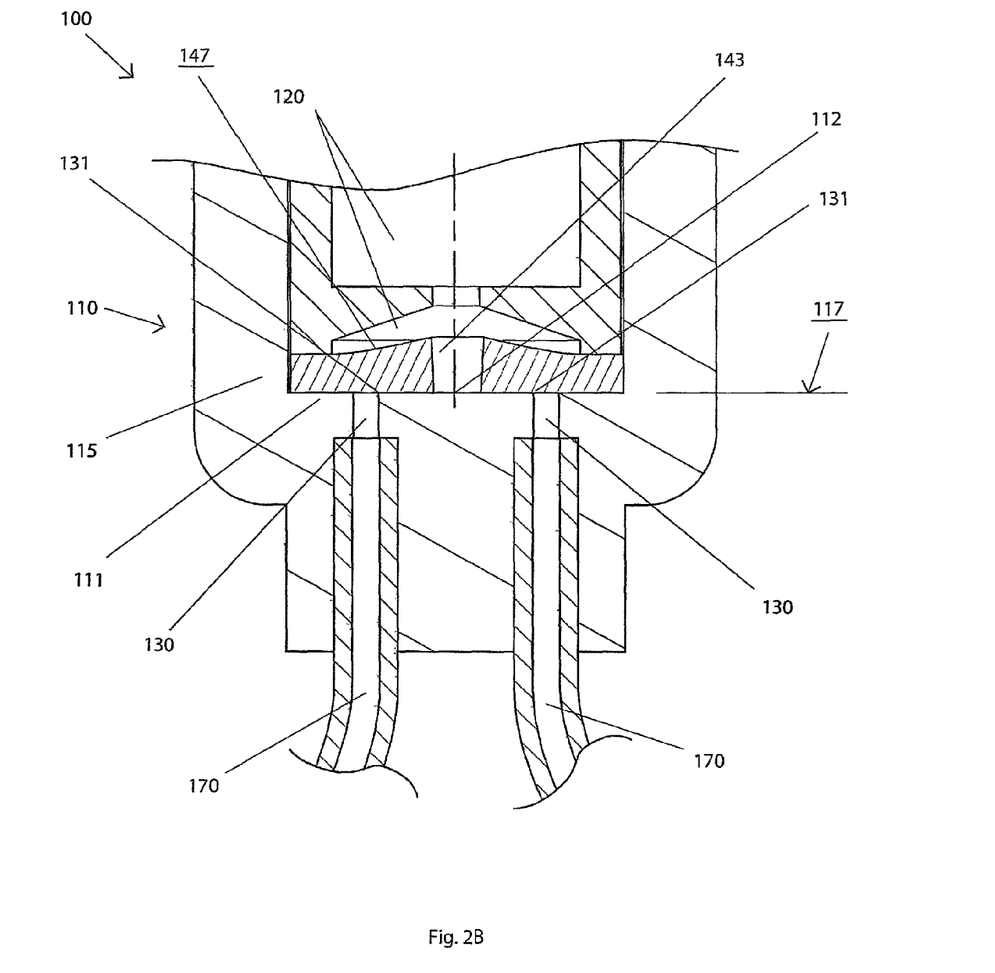
Figure 3:
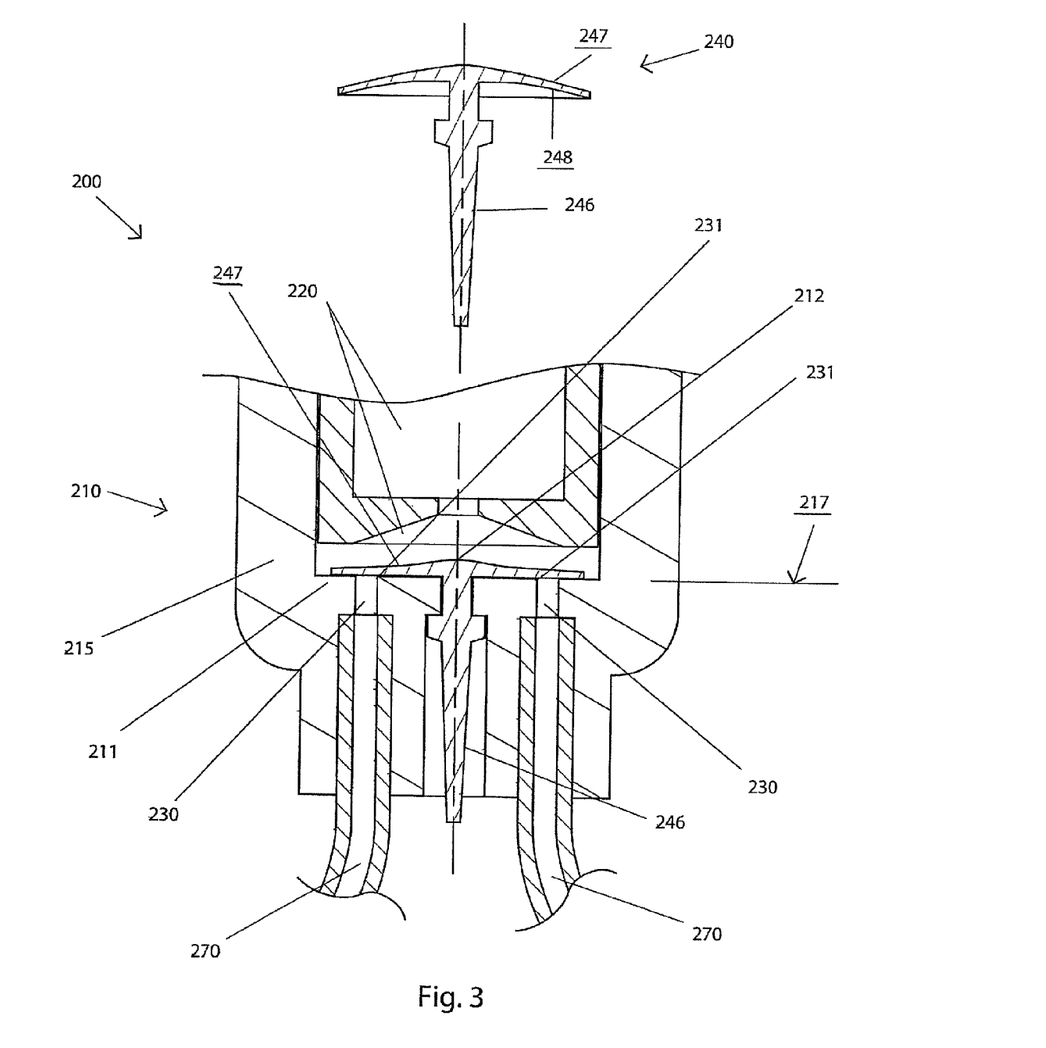
FIG. 3 is a cross-sectional front view of an aspect of the mixing and dispensing device taken through the body and the flow channels and showing a seal having a shaft as a partial assembly.
Figure 7A:
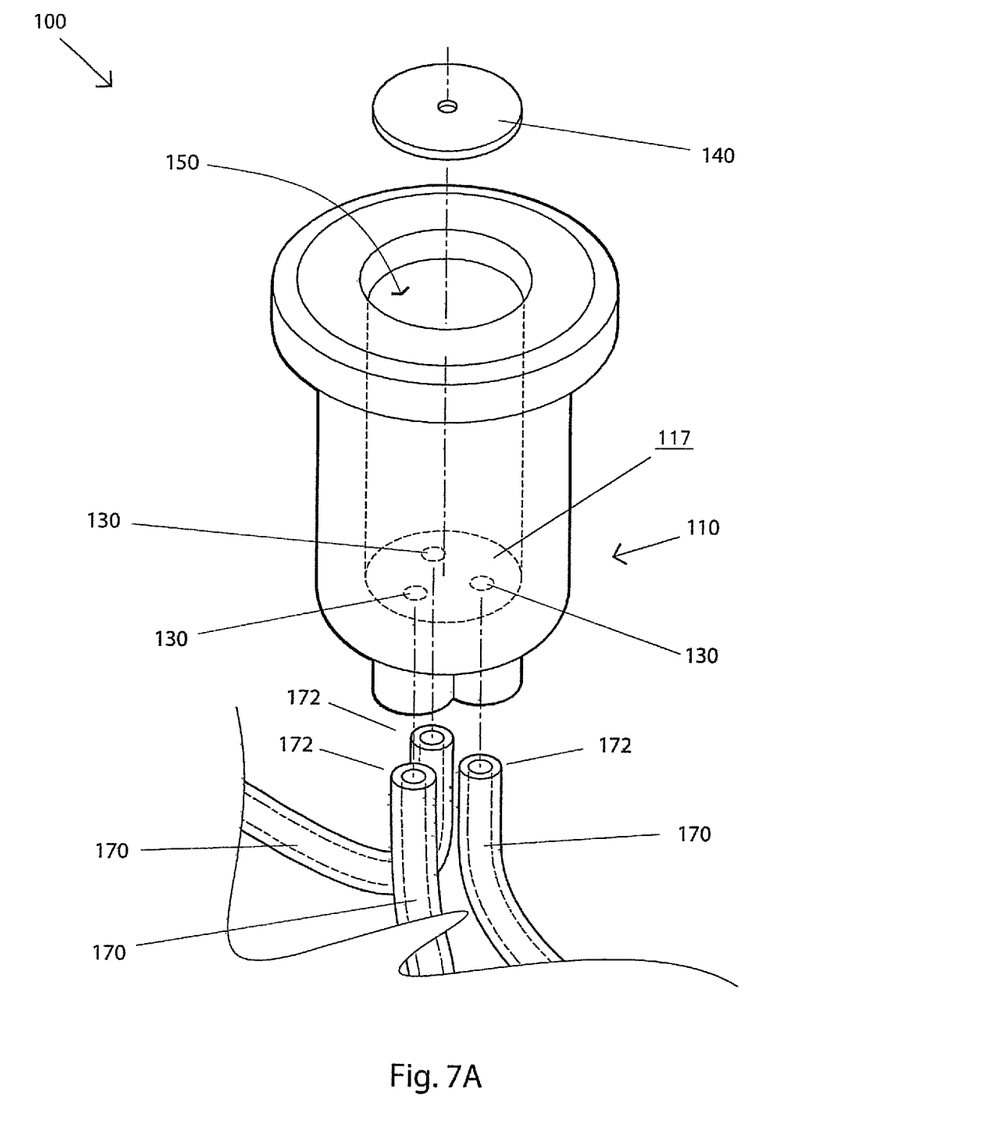
FIGS. 7A-7B are exploded isometric views showing the device having inlets and flow channels (FIG. 7A) each having an equal sectional area and (FIG. 7B) each having different sectional areas.
Figure 7B:
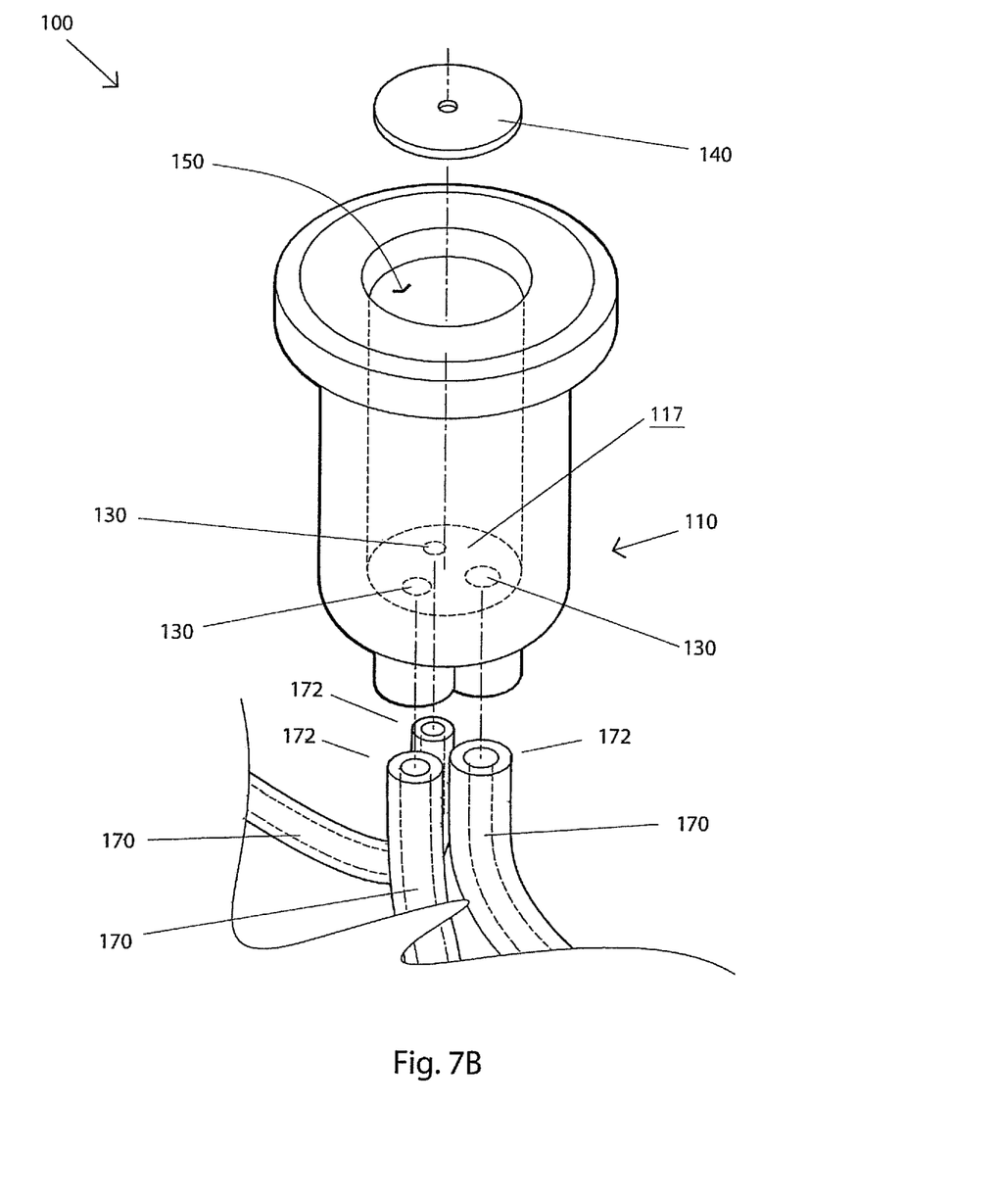
Figure 8A:
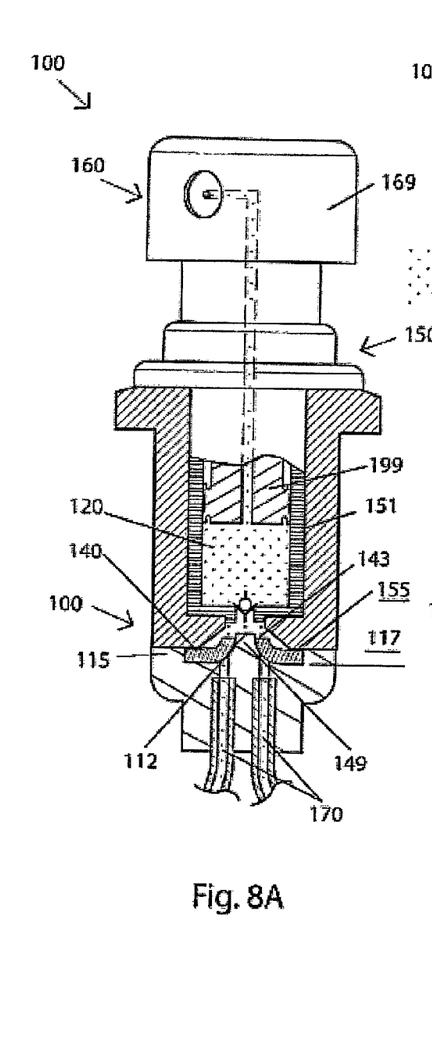
FIGS. 8A-8C are orthographic front views of an aspect of the device (with the body, the seal, and the flow channels shown in cross-section for clarity) (FIG. 8A) in a resting mode, (FIG. 8B) in a dispensing mode, and (FIG. 8C) in a rebound mode.
Figures 8B, 8C:
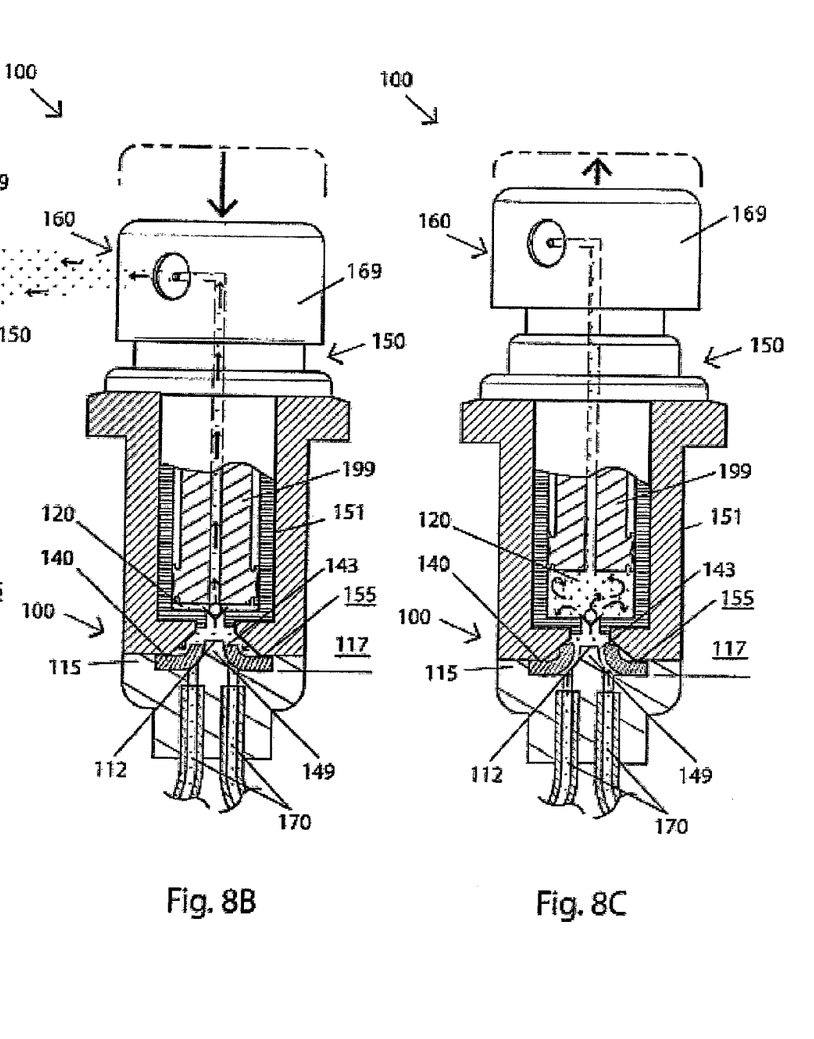

Referring to FIGS. 1-3, a body 110 has first and second walls 111, 115 that form a chamber 120. The first wall 111 has an interior surface 117 and a central point 112 thereon. As described in greater detail below, the inlets 130 may be positioned in the first wall 111 relative to the central point 112. According to the present invention, the first wall 111 may be substantially, or in some cases, completely, flat and may have an interior surface 117 that also may be substantially, or in some cases, completely, flat, respectively (FIGS. 2, 4, 5, 7). Alternatively, according to the present invention, the first wall 111 may vary in, for example, contours, tapers or other features (FIGS. 1 and 8A-8C) and may have an interior surface 117 that also may vary in contours, tapers or other features to vary sealing characteristics of the seal. For example, the interior surface 117 of the first wall 111 may have a protrusion into the chamber 120, such as an interior surface having a convex curved shape, (FIG. 1), a convex polygonal shape (not shown), or a conical shape (FIG. 8).

As shown generally, in the Figures, according to the present invention, at least two inlets 130 to the chamber 120 are configured to receive the fluid from the at least two containers 105. Each inlet 130 has a sectional area and at least one edge 131. Optionally, the sectional area of each of the inlets 130 may be equal (FIG. 7A), or alternatively, the sectional area of at least one of the inlets may be smaller than a sectional area of the other of the at least two inlets (FIG. 7B). As shown generally in the Figures, at least two inlets 130 may be spaced-apart and arranged in a linear or non-linear array in the first wall 111 of the body 110 relative to the central point 112. As illustrated in FIGS. 1 and 2, proximate edges 131 of the inlets 130 optionally may be an equal distance from the central point 112 on the interior surface 117 of the first wall 111. Optionally, according to the present invention, as illustrated in FIG. 8, inlets 130 may be positioned at or proximal to a base of the conical shape forming the conical wall surface of first wall 111.

According to the present invention, inlet 130 is configured to receive fluid from one of the containers 105. According to the present invention, the device 100 comprises at least two flow channels 170 each configured to carry fluid from one of the containers 105 to the chamber 120 through a corresponding inlet 130. See, e.g., FIGS. 4A-4C and 8A-8C. As illustrated in FIG. 6, each flow channel 170 is connected at a first end 171 to a corresponding one of the containers 105 and at a second end 172 to a corresponding inlet 130 into the chamber 120. Each flow channel 170 has a sectional area. The flow channels 170 may be compressible or pliable, such as an elastomeric material made of, for example, extruded PVC, silicone, etc., or the flow channels may be made of a semi-rigid or rigid material. The sectional area of each flow channel 170 may be equal (FIGS. 6A, 7A), and a volumetric ratio of each fluid comprising the mixture may be adjusted by an adjustable valve 180 (FIG. 6A) that independently adjusts the mass flow rate of each one of the fluids that is drawn from a container 105 through the corresponding flow channel 170 during operation of the device 100. Alternatively, the sectional area of at least one of the flow channels 170 may be smaller than a sectional area of the other flow channels 170 (FIG. 7B) such that the volumetric ratio of each fluid comprising the mixture may be directly proportional to the sectional area of each flow channel 170, which may determine the mass flow rate of the fluid therethrough during operation of the device 100.

As illustrated generally in FIGS. 1-7, according to the present invention, a seal 140 having a top surface 147 having a surface area, a bottom surface 148, and a center through hole 143 may be secured in the chamber 120 around a perimeter of the seal 140. Alternatively, according to the present invention, and as illustrated in FIG. 8, the seal 140 may be secured in the chamber 120 by positioning the protrusion, such as the conical protrusion 149, of the interior surface 117 of first wall 111, through the central through hole 143 of seal 140. The surface area of the top surface 147 of the seal 140 may be greater than a sum of the sectional areas of the at least two inlets 130 and of a sectional area of the central through hole 143. As shown in FIGS. 1, 2, and 8, the center through hole 143 may be substantially aligned with the central point 112 on the interior surface 117 of the first wall 111. The seal 140 may be resilient, such as a material made of silicone or a solvent-resistant thermoplastic elastomer, semi-rigid, or rigid.

Figure 5:
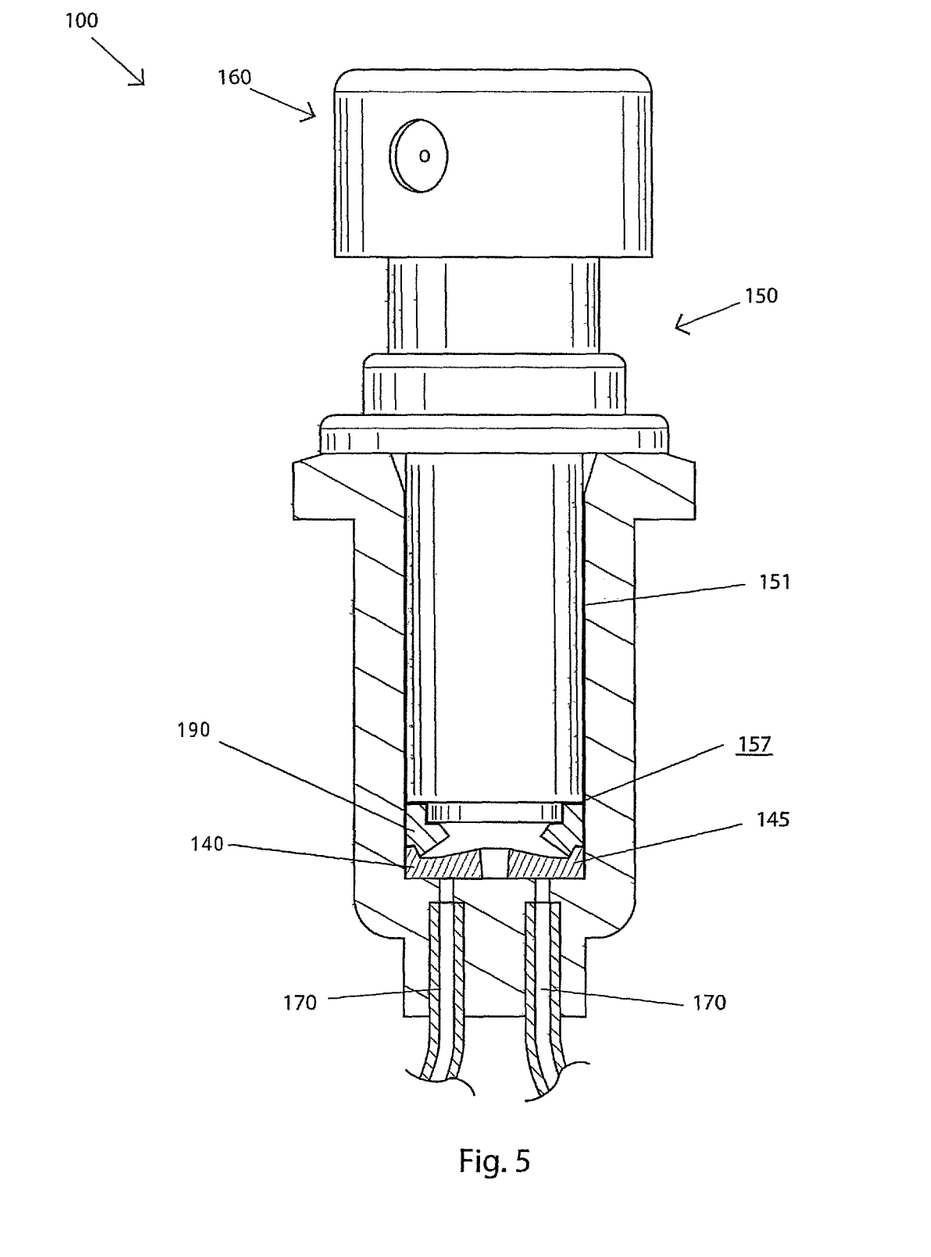
FIG. 5 is an orthographic front view of an aspect of the device (with the body, the seal, and the flow channels shown in cross-section for clarity)

The 140 seal may be a planar member (FIGS. 1, 7, 8) or may vary in, for example, shape, size, and/or thickness, and may include contours, tapers or other features (FIG. 2), which together with the contour of the interior surface 117 of the first wall 111, may vary sealing and opening characteristics of the inlets 130. As illustrated in FIGS. 2 and 5, optionally the seal 140 may be secured about a peripheral edge and may include retention or sealing features such as a rim 141 or indenting sealing features. The seal 140 also may have a rim 141 around a peripheral edge and/or a perimeter of the hole (not shown).

As described above, according to the present invention, optionally the seal 140 may be secured around its perimeter in the chamber 120. As illustrated in FIGS. 1, 2, and 4, a bottom surface 157 of the pump body 151 wall may engage the top surface 147 of the seal 140. Optionally, according to the present invention, as illustrated in FIG. 5, there may be an engaging member 190 in the chamber 120 proximal to the seal 140. The engaging member 190 has a surface 157 that engages the top surface 147 of the seal 140. Optionally, according to the present invention, the surface 157 of the engaging member 190 may comprise a rigid rim 195 that compressingly engages the top surface 147 of the seal 140 to secure the seal 140 in the chamber 120. Optionally, the seal 140 may be secured to one of the walls 111, 112 of the body 110, such as a rim 141 around the outer perimeter of the seal 140 that may engage a complementary groove (not shown) in the second wall 112 of the body 110 to secure the seal 140 in the chamber 120. Optionally, according to the present invention, as illustrated in FIG. 8, the seal 140 may be secured in the chamber 120 by positioning the protrusion, such as the conical protrusion 149, of the interior surface 117 of first wall 111, through the central through hole 143 of seal 140.

Figure 4A:
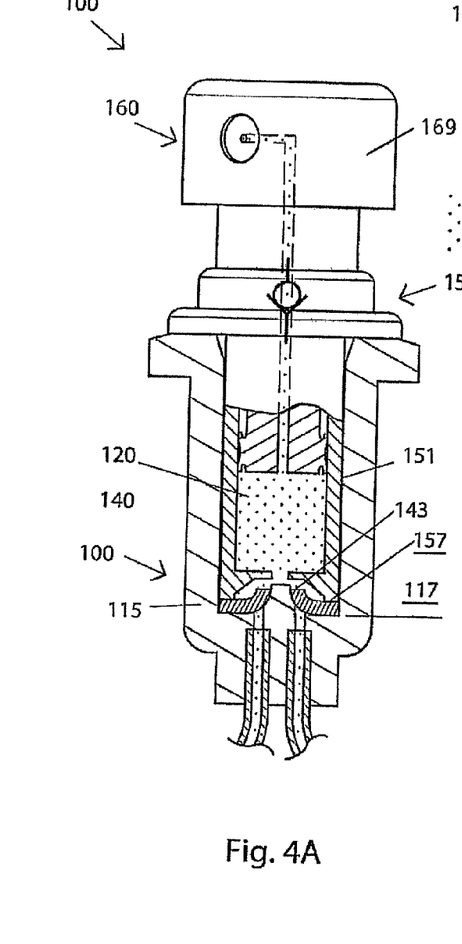
FIGS. 4A-4C are orthographic front views of an aspect of the device (with the body, the seal, and the flow channels shown in cross-section for clarity) (FIG. 4A) in a resting mode, (FIG. 4B) in a dispensing mode, and (FIG. 4C) in a rebound mode.
Figure 4B:
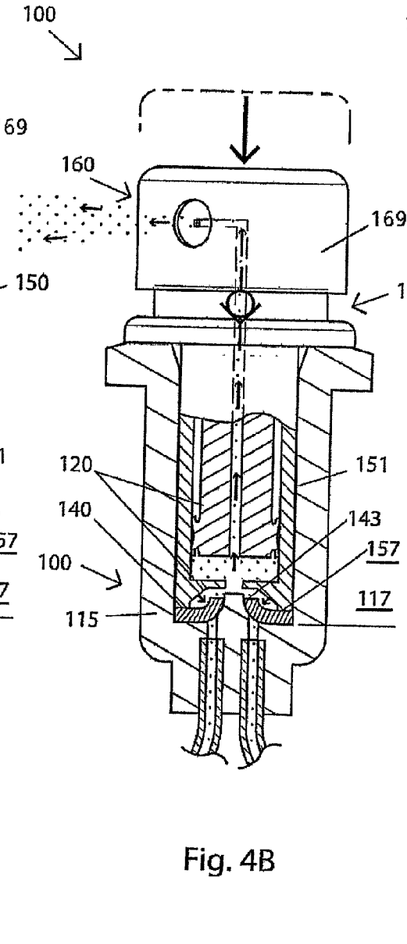
Figure 4C:
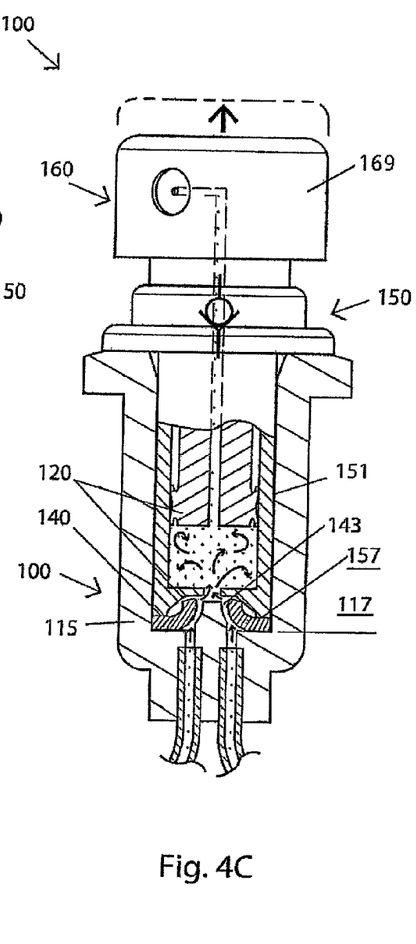

According to the present invention, the seal 140 is moveable between a sealed position (FIGS. 1B, 2B, 4A, 4B, 8A, 8B) and an open position (FIGS. 4C, 8C). The seal position is controlled by operation of the dispensing pump 150, as described in greater detail below. As illustrated in FIGS. 1B, 2B, 4A, 4B, 8A, and 8B, in the sealed position, the bottom surface 148 of the seal 140 seals the at least two inlets 130 in order to substantially, or in some cases completely, prevent the anterograde flow of fluid into the chamber 120 or cross-flow between inlets 130. As illustrated in FIGS. 4C and 8C, in the open position, the bottom surface 148 of the seal 140 is spaced away from the at least two inlets 130 to open the inlets 130 to the chamber 120 to draw fluids from the containers 105 through the inlets 130 into the chamber 120 through the hole 143 to form the mixture.

As illustrated in FIGS. 4, 6, and 8, according to the present invention, a dispensing pump 150 is positioned downstream from the chamber 120 and is configured to communicate with a downstream nozzle 160. The dispensing pump 150 may be any appropriate pump known to those skilled in the art. The dispensing pump 150 may be manually actuated or electronically actuated with a manually actuated button that electronically operates the dispensing pump assembly 150 by means of a motor drive, for example.

The nozzle 160 may be configured for communication with the dispensing pump 150 and may be configured to dispense the mixture when the device 100 is in operation. The nozzle 160 may be any of a variety of types of nozzle that is configured to dispense a spray, mist, drop, stream, etc. of a mixture of fluids. The dispensing pump may be any appropriate such pump used, for example, for fragrances, creams, and the like and comprising injection molded components, such as for example, a nozzle, a piston-type pump in a dispensing chamber, a return spring, and having a check valve between the piston and the nozzle.

As described above, and as illustrated in FIG. 6A, according to the present invention, the device 100 may be configured for connection to at least two containers 105 each configured to contain a fluid. Optionally, each container 105 may be removable and refillable or replaceable. Alternatively, according to the present invention, each container 105 may be permanently affixed to the device 100. The containers 105 may be of differing or the same volume capacity, length, or diameter. According to the present invention, the containers 105 may be made from, by way of example, glass, plastic, metallic materials, collapsible or pliable materials such as a bladder, or materials that are resistant to degradation by the fluids contained or to be contained therein. Optionally, the containers 105 may be clear to render the fluid contents visible. Optionally, a window (not shown) may be positioned in a wall of an opaque container 105 to show the fluid contents thereof.

As illustrated in FIGS. 6A and 6B, each container 105 optionally may have a gasket (not shown) or closure device 101, such as a cap, seal, or the like that substantially closes the container 105 so that the fluid contained therein does not leak out. The closure device 101 may be either integral with the container 105 or assembled. A port (not shown) may be positioned in or integral with the closure device 101 to provide communication between the container 105 and the corresponding flow channel 170 when the port is in the opened position. The port may be configured to receive a first end 171 of the corresponding flow channel 170 or a coupling (not shown), such as a spike, needle, nipple, zerk, or other such connector, that connects or couples the distal end of the corresponding flow channel 170 to the container 105. In an aspect, the port may be a pierceable septum.

The container may be attached to a receptacle 102 by any means known to those skilled in the art. In an aspect illustrated in FIG. 6A, the receptacle 102 may be configured to receive a neck of the container 105. The neck and the receptacle 102 may threadably engage or the container 105 may snap-fit into the receptacle 102.

As illustrated in FIG. 6B, according to the present invention, each container 105 may have a vent 103 that is configured for entry of atmospheric air into the container 105 as fluid is drawn out by operation of the dispensing pump 150. The vent 103 substantially eliminates the buildup of vacuum in the container 105 and is configured to substantially prevent leakage of the fluid from the container 105. In aspects, the vent 103 may be positioned within or is integral with the closure device 101 or the port. By way of example, the vent 103 may be an elastomeric duck-bill valve, a flapper valve, an umbrella valve, a diaphragm, a microporous plug or membrane, etc. In another example, the vent 103 may be a spring-loaded assembly such as a ball or ball plunger that engages a sealing aperture.

Optionally, as illustrated in FIG. 6B, a conduit 104, such as a sipper tube, may be included in each container configured to draw fluid from the interior of the container 105 and to communicate with the distal end of the corresponding flow channel 170. According to the present invention, conduit 104 may connect to receptor 102 at one end and the other end inserted through the hole in closure device 101.

Optionally, as illustrated in FIG. 6C, a bladder 106 configured to hold the fluid may be positioned in the interior of the container 105. The port may be in communication with the interior of the bladder 106. In aspects, the bladder 106 may be at least one of flexible, removable, replaceable, and refillable.

Optionally, the containers 105 and the body 110 may be enclosed in a housing (not shown). Optionally, the housing may be comprised of a single component or multiple components. Optionally, a portion of the housing may be removable or may be configured to open or close to provide or restrict access, respectively, to the containers 105, for example, as useful to remove and replace a container 105. The housing may be made of plastic, such as injection molded polycarbonates, polystyrenes, etc.

A resting mode of a device 100 is illustrated in FIG. 4A. As shown, seal 140 is in the sealed position. A sealing force against the inlets is achieved by a preload stress upon the perimeter of the top surface of the seal which passes through the seal to the bottom surface of the seal positioned over the at least two inlets to seal the inlets. A contoured bottom surface of the seal positioned against a planar interior first wall contributes to the preload stress by deforming the seal. The bottom surface of the seal forms a contact with the interior of the first wall so that the seal is substantially, or in some cases completely, sealed against the at least two inlets. As illustrated in FIG. 1B, contoured forms such as a conical or domed form optionally protrude from the interior of the first wall of the chamber and contribute to the preload stress by deforming the seal. The bottom surface of the seal forms a contact with the interior of the first wall so that the seal is substantially, or in some cases completely, sealed against the at least two inlets.

A dispensing mode of the device 100 is shown in a dispensing mode in FIG. 4B. In the dispensing mode, seal 140 is in the sealed position. The sealing force between the bottom surface 148 of the seal 140 and the edges of the inlets 130 seals fluid flow through the inlets 130. The sealing force is increased by the increasing fluid pressure within the chamber 120 which results from the movement of the piston into the chamber 120 which decreases the volume of the fluid within chamber 120 as the fluid is dispensed through the nozzle 160.

Device 100 is shown in a rebound mode in FIG. 4C. In the rebound mode, seal 140 is moved to the open position. The piston rises within the chamber 120 creating a negative pressure which acts upon the top surface 147 of the seal 140 to draw the bottom surface 148 of the seal 140 away from the interior surface 117 of the first wall 111, which draws fluid from the container 105 into the flow channels 170 and through the inlets 130 and the hole 143 into the chamber 120 to refill the chamber 120.

As described above and as illustrated in FIG. 8, optionally, device 100 may have interior surface 117 of the first wall 111 having a conical shape that is positioned through the center through hole 143 of the seal 140. The housing is split in two in order to create a half-housing and a lower surface of the half-housing 155 engages a portion of the seal 140. As illustrated in FIG. 8A, at rest, seal 143 is in the sealed position. A sealing force against the inlets 130 is achieved by a preload stress upon the perimeter of the top surface 147 of the seal 140 which passes through the seal 140 to the bottom surface 148 of the seal 140 positioned over the at least two inlets 130 to seal the inlets 130. A conical protrusion 149 through the central hole 143 in the seal 140 stretches the seal 140 annularly, resulting in a hoop stress within the seal 140, which creates a sealing pressure against the bottom surface 148 of the seal 140 and the conical protrusion 149. The bottom surface 148 of the seal 140 forms a contact with the interior surface 117 of the first wall 117 so that the seal 140 is substantially, or in some cases completely, sealed against the at least two inlets 130.

Device 100 is shown in a dispensing mode in FIG. 8B. In the dispensing mode, seal 140 is in the sealed position. The sealing force between the bottom surface 148 of the seal 140 and the edges of the inlets 130 seals fluid flow through the inlets 130.

Device 100 is shown in a rebound mode in FIG. 8C. In the rebound mode, seal 140 is deformed to the open position. The piston 199 rises within the chamber 120 creating a negative pressure which acts upon the top surface 147 of the seal 140 to draw the bottom surface 148 of the seal 140 away from the interior surface 117 of the first wall 111, which draws fluid from each container 105 into the corresponding flow channel 170 and through the inlets 130 and the center through hole 143 into the chamber 120 to refill the chamber 120.

A device according to the present invention for dispensing a mixture of at least two fluids is illustrated in FIG. 3. As described above, the component parts and surfaces of the device designated as 100 were referred to with corresponding reference numbers in the 100 series. The component parts of the device shown in FIG. 3 are referred to with reference numbers in the 200 series. For example, the body of device 100 is designated 110, while the body of the device shown in FIG. 3 is designated 210. The body 210, inlets 230, dispensing pump 250, nozzle, and each of their respective component parts and surfaces of the device shown in FIG. 3 are the same as the corresponding parts and surfaces of device 100 and therefore the description of these parts is not repeated herein with respect to the device 200 shown in FIG. 3.

As discussed above with respect to device 100, the device shown in FIG. 3 comprises a body 210 comprising first and second walls 211, 215 that form a chamber 220 that may be connected to a nozzle 260. At least two spaced-apart inlets 230 to the chamber 220 may be arranged in the first wall 211 of the body 210 such that proximate edges of the at least two inlets 230 are an equal distance from a generally central point 212 on the first wall 211, each of the inlets 230 having a sectional area, and each of the inlets 230 configured to receive the fluid from one of the at least two containers 205.

As illustrated in FIG. 3, according to the present invention, a seal 240 having a top surface 247, a bottom surface 248, and a central shaft 246 may be secured in the chamber 220 by securing the central shaft 246 in the first wall 211 at the central point 212 such that the central shaft 246 of the seal 240 may be substantially aligned with the central point 212, of the interior of the first wall 217.

The surface area of the top surface 247 of the seal 240 may be greater than a sum of the sectional areas of the at least two inlets 230. The seal may be of low compliance force so as to be drawn easily open by the dispensing pump to draw fluid through the at least two inlets 230. The seal 240 may be resilient, such as a material made of silicone or a solvent-resistant thermoplastic elastomer, semi-rigid, or rigid.

The seal 240 may be moveable between a sealed position and an open position. According to the present invention, the sealed position may be controlled by operation of the dispensing pump 250. In the sealed position, the bottom surface 248 of the seal 240 seals the at least two inlets 230 in order to substantially, or in some cases completely, prevent the anterograde flow of fluid into the chamber 220 or cross-flow between the at least two inlets 230, each independently associated with fluid flow from one of the at least two containers. In the open position, the bottom surface 248 of the seal 240 is spaced away from the at least two inlets 230 to open the inlets 230 to the chamber 220 to draw fluids from the containers (not shown) through the inlets 230 into the chamber 220 to form the mixture.

Referring still to FIG. 3, as described above with respect to device 100, according to the present invention, a dispensing pump 250 is operable to move the seal 240 from the sealed position to the open position to draw the fluids from the containers 205 through the at least two inlets 230 into the chamber 220 to form the mixture. The nozzle (not shown) is configured to dispense the mixture upon activation.

While the foregoing has been set forth in considerable detail, it is to be understood that the drawings and detailed aspects are presented for elucidation and not limitation. Design variations, especially in matters of shape, size and arrangements of parts may be made but are within the principles described herein. Those skilled in the art will realize that such changes or modifications of the invention or combinations of elements, variations, equivalents or improvements therein are still within the scope of the system and device as defined in the appended claims.

We claim:
1. A device for dispensing a mixture of at least two fluids contained in at least two containers, comprising:
   a body comprising first and second walls that form a chamber that is connected to a nozzle;
   at least two spaced-apart inlets to the chamber arranged in an array in the first wall of the body such that proximate edges of the at least two inlets are an equal distance from a generally central point on the first wall, each of the inlets having a sectional area, and each of the inlets being configured to receive the fluid from one of the at least two containers;
   a seal positioned in the chamber adjacent to the first wall, wherein the seal has a top surface, a bottom surface, and a center through hole substantially aligned with the central point;
   wherein a surface area of the top surface is greater than a sum of the sectional areas of the at least two inlets;
   wherein the seal is moveable between a sealed position in which the bottom surface seals the at least two inlets and an open position in which the bottom surface is spaced away from the at least two inlets to open the inlets to the chamber through the hole; and
   a dispensing pump that is operable to move the seal between the sealed and the open positions;
   wherein the nozzle is configured to dispense the mixture upon activation.

2. The device as in claim 1, further comprising the at least two containers, each container configured to hold one of the at least two fluids.

3. The device as in claim 1, further comprising at least two flow channels, each flow channel having a first end connected to one of the containers and a second end connected to one of the inlets.

4. The device as in claim 3, wherein a sectional area of at least one of the at least two flow channels is smaller than a sectional area of the other of the at least two flow channels.

5. The device as in claim 1, further comprising at least two independently actuable valves, each valve for controlling a flow of one of the fluids into the chamber.

6. The device as in claim 1, further comprising an engaging member positioned in the chamber proximal to the seal and having a surface that engages the top surface of the seal.

7. The device as in claim 1, further comprising an engaging member positioned in the chamber proximal to the seal and having a surface comprising a rim that compressingly engages the top surface of the seal.

8. The device as in claim 1, wherein the surface area of the top surface is greater than a sectional area of the center through hole.

9. The device as in claim 1, wherein an interior surface of the first wall is substantially planar.

10. The device as in claim 1, wherein an interior surface of the first wall comprises a convex shape.

11. The device as in claim 1, wherein an interior surface of the first wall comprises a conical shape.

12. The device as in claim 11, wherein the conical shape is positioned through the center through hole of the seal.

13. The device as in claim 1, wherein at least one of the top surface and the bottom surface of the seal is planar.

14. The device as in claim 1, wherein at least one of the top surface and the bottom surface of the seal is contoured.

15. The device as in claim 1, wherein at least one of the top surface and the bottom surface is tapered.

16. The device as in claim 1, wherein the top surface of the seal comprises a rim.

17. The device as in claim 1, wherein the bottom surface of the seal comprises a rim.

18. The device as in claim 1, wherein the dispensing pump is operable to move the seal to the open position to draw the fluids from the containers through the at least two inlets into the chamber through the hole to form the mixture and to move the seal from the open position to the sealed position.

* * * * *